United States Patent
Watanabe

(10) Patent No.: US 9,729,732 B2
(45) Date of Patent: Aug. 8, 2017

(54) TRANSMISSION APPARATUS, RECEPTION APPARATUS, TRANSMISSION METHOD, RECEPTION METHOD, AND STORAGE MEDIUM

(71) Applicant: CANON KABUSHIKI KAISHA, Tokyo (JP)

(72) Inventor: Ryo Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 14/141,355

(22) Filed: Dec. 26, 2013

(65) Prior Publication Data
US 2014/0184823 A1    Jul. 3, 2014

(30) Foreign Application Priority Data

Dec. 28, 2012    (JP) ................................ 2012-287784

(51) Int. Cl.
*H04N 1/00*      (2006.01)
*G06F 3/00*      (2006.01)

(52) U.S. Cl.
CPC ......... *H04N 1/00204* (2013.01); *G06F 3/005* (2013.01)

(58) Field of Classification Search
CPC ............... H04N 5/232; H04N 5/23203; H04N 5/23206; H04N 1/00204; G06F 3/005
See application file for complete search history.

(56) References Cited

U.S. PATENT DOCUMENTS

| | | | | |
|---|---|---|---|---|
| 7,095,436 B2 * | 8/2006 | Kato | ................ | H04N 1/00384 348/207.1 |
| 7,755,661 B2 * | 7/2010 | Aizawa | .............. | H04N 1/00204 348/207.1 |
| 8,473,628 B2 * | 6/2013 | Kapoor | ............. | G06F 17/30053 709/203 |
| 2002/0036698 A1 * | 3/2002 | Mizutani | .............. | H04N 1/2112 348/231.99 |
| 2010/0262711 A1 * | 10/2010 | Bouazizi | ............. | H04L 65/4084 709/231 |
| 2012/0060176 A1 * | 3/2012 | Chai | ...................... | H04H 60/45 725/10 |
| 2012/0311075 A1 * | 12/2012 | Pantos | ............... | H04N 21/4825 709/217 |

FOREIGN PATENT DOCUMENTS

| | | | |
|---|---|---|---|
| JP | 2007-074684 A | 3/2007 | |
| JP | 2012-514276 A | 6/2012 | |
| WO | WO 2010078281 A2 * | 7/2010 | ......... H04L 65/1069 |
| WO | 2011059286 A2 | 5/2011 | |

* cited by examiner

*Primary Examiner* — Timothy J Henn
(74) *Attorney, Agent, or Firm* — Canon U.S.A., Inc. IP Division

(57) ABSTRACT

A transmission apparatus transmits second metadata when it receives a second acquisition request of metadata (e.g., playlist) after the transmission apparatus has received a first acquisition request of the metadata. Segment data indicated by the second metadata to be acquirable by a reception apparatus includes not segment data already transmitted to the reception apparatus but segment data yet to be transmitted to the reception apparatus among segment data indicated by first metadata transmitted in response to the first acquisition request.

17 Claims, 11 Drawing Sheets

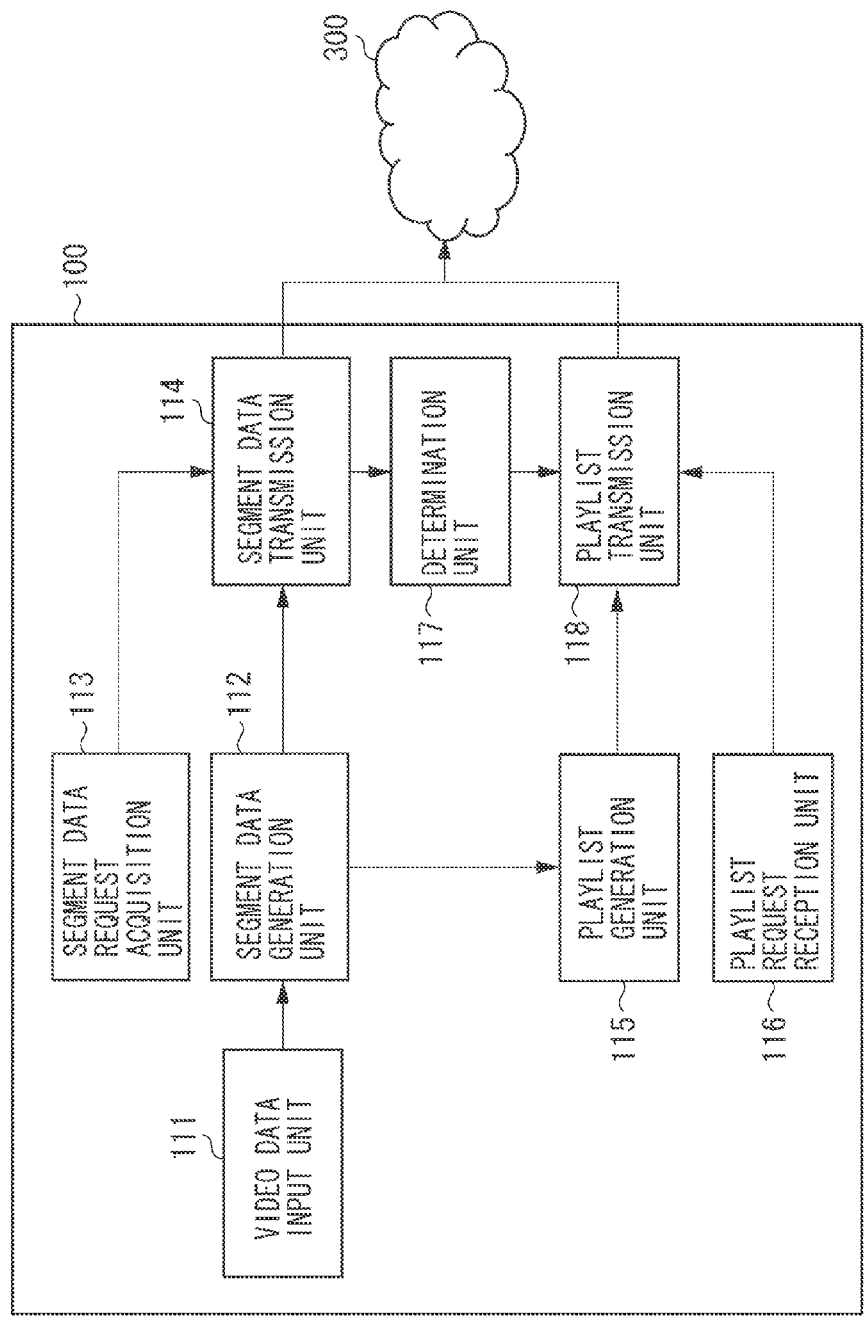

FIG. 4

| SEGMENT NUMBER | URI | TIME LENGTH |
|---|---|---|
| 1 | http://xxx/video101.mp4 | 0.5 SECONDS |
| 2 | http://xxx/video102.mp4 | 0.5 SECONDS |
| 5 | http://xxx/video105.mp4 | 0.5 SECONDS |

TRANSMISSION APPARATUS, RECEPTION APPARATUS, TRANSMISSION METHOD, RECEPTION METHOD, AND STORAGE MEDIUM

BACKGROUND OF THE INVENTION

Field of the Invention

The present invention relates to a technique enabling a transmission apparatus to transmit contents to a reception apparatus via a network. More particularly, the present invention relates to a technique for transmitting metadata indicating segment data receivable by the reception apparatus, which is a plurality of segment data constituting a content, from the transmission apparatus to the reception apparatus.

Description of the Related Art

As a technique for transmitting moving image data, Japanese Unexamined Patent Application Publication (Translation of PCT Application) No. 2012-514276 discusses a transmission apparatus that stores moving image data to be transmitted in a plurality of segment data, and transmits each segment data to a reception apparatus via a network.

The transmission apparatus discussed in Japanese Unexamined Patent Application Publication (Translation of PCT Application) No. 2012-514276 associates address information needed by the reception apparatus to receive the segment data with each segment data. As the address information, for example, a uniform resource identifier (URI) is associated with each data.

The transmission apparatus transmits to the reception apparatus, in response to a request from the reception apparatus, metadata (hereinafter, referred to as playlist) including a plurality of pieces of address information associated with the plurality of segment data.

The reception apparatus discussed in Japanese Unexamined Patent Application Publication (Translation of PCT Application) No. 2012-514276 requests the segment data based on the address information included in the received playlist, and receives the segment data from the transmission apparatus.

The transmission apparatus discussed in Japanese Unexamined Patent Application Publication (Translation of PCT Application) No. 2012-514276 updates the playlist after new data has been added to the moving image data to be transmitted. When a new playlist request arrives from the reception apparatus after the playlist has been updated, the transmission apparatus discussed in Japanese Unexamined Patent Application Publication (Translation of PCT Application) No. 2012-514276 transmits the updated playlist to the reception apparatus.

It is discussed in Japanese Unexamined Patent Application Publication (Translation of PCT Application) No. 2012-514276 that when the transmission apparatus updates the playlist, the URIs of the segment data can be eliminated from the playlist in the order of addition to the playlist.

Japanese Patent Application Laid-Open No. 2007-74684 discusses a public server that sequentially receives segment data acquired by dividing moving image data from a video server, and generates a playlist each time a viewing request is received from a reception apparatus. The public server transmits the generated playlist to the reception apparatus.

The public server, which has received the viewing request from the reception apparatus, transmits a playlist of segment data after latest segment data reception of which by the public server from the video server had been completed at the time of receiving the viewing request to the reception apparatus. The number of pieces of address information of the segment data described in one playlist is set beforehand in the public server or designated from the reception apparatus.

Conventionally, no consideration has been given to a transmission situation of the segment data to the reception apparatus when the playlist is generated.

In a moving image delivery system discussed in Japanese Unexamined Patent Application Publication (Translation of PCT Application) No. 2012-514276, a redundant playlist including the URI of the segment data already received by the reception apparatus may be transmitted to the reception apparatus.

In a moving image delivery system discussed in Japanese Patent Application Laid-Open No. 2007-74684, the reception apparatus receives the playlist of the latest segment data generated at the time of receiving the viewing request by the transmission apparatus and subsequent segment data. Thus, the reception apparatus cannot receive a playlist of the segment data before the latest segment data and not received from the transmission apparatus.

SUMMARY OF THE INVENTION

The present invention is directed to an apparatus capable of transmitting or receiving, when metadata (e.g., playlist) indicating segment data acquirable by a reception apparatus is transmitted or received, the metadata according to a transmission situation of the segment data to the reception apparatus.

According to an aspect of the present invention, a transmission apparatus configured to transmit metadata indicating segment data acquirable, among a plurality of segment data constituting a content, by a reception apparatus to the reception apparatus, includes a reception unit configured to receive an acquisition request of the metadata from the reception apparatus, and a transmission unit configured to transmit to the reception apparatus, in a case where the reception unit receives a second acquisition request of the meta data after the reception unit has received a first acquisition request of the meta data, second metadata including not segment data already transmitted to the reception apparatus but segment data yet to be transmitted to the reception apparatus among a plurality of segment data indicated by first metadata transmitted in response to the first acquisition request as the segment data that the reception apparatus can acquire, wherein the number of segment data included in acquirable segment data indicated by the second metadata but not included in acquirable segment data indicated by the first metadata corresponds to the number of segment data included in the acquirable segment data indicated by the first metadata but not included in the acquirable segment data indicated by the second metadata.

According to another aspect of the present invention, a reception apparatus configured to receive from a transmission apparatus metadata indicating segment data acquirable among a plurality of segment data constituting a content, includes a transmission unit configured to transmit an acquisition request of the metadata, and a reception unit configured to receive, in a case where the transmission unit transmits a second acquisition request of the meta data after the transmission unit has transmitted a first acquisition request of the meta data, second metadata including not segment data already transmitted from the transmission apparatus to the reception apparatus but segment data yet to be received by the reception apparatus among a plurality of segment data indicated by first metadata transmitted by the transmission apparatus according to the first acquisition request in the segment data that the reception apparatus can acquire from the transmission apparatus, wherein the number of segment data included in acquirable segment data indicated by the second metadata but not included in acquirable segment data indicated by the first metadata corresponds to the number of segment data included in the acquirable segment data indicated by the first metadata but not included in the acquirable segment data indicated by the second metadata.

Further features of the present invention will become apparent from the following description of exemplary embodiments with reference to the attached drawings.

BRIEF DESCRIPTION OF THE DRAWINGS

FIG. 2B is a block diagram illustrating a functional configuration of the transmission apparatus 100 according to the first exemplary embodiment.

FIG. 4 is a table illustrating an example of a playlist according to the first exemplary embodiment.

DESCRIPTION OF THE EMBODIMENTS

Various exemplary embodiments, features, and aspects of the invention will be described in detail below with reference to the drawings. Configurations of the exemplary embodiments are only examples, and the present invention is not limited to the illustrated configurations.

Figure 1:
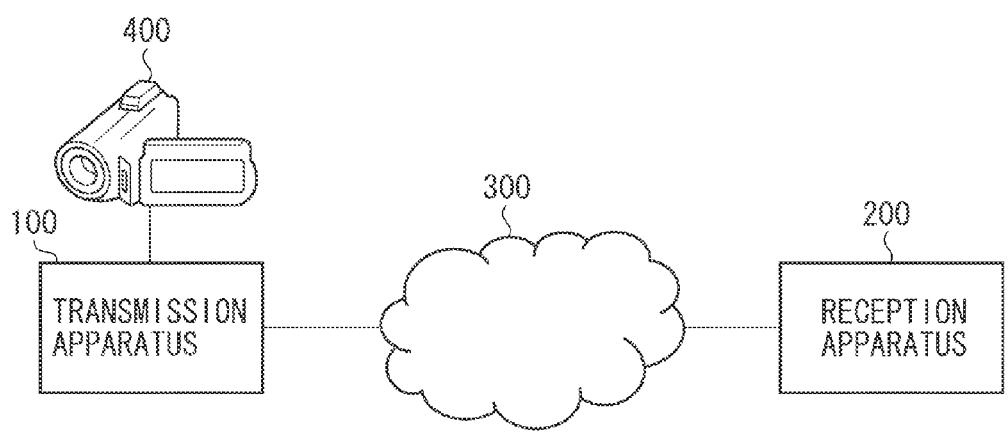
FIG. 1 is a diagram illustrating a configuration of a transmission system according to a first exemplary embodiment.

FIG. 1 is a diagram illustrating a configuration of a transmission system according to a first exemplary embodiment of the present invention. A transmission apparatus 100 illustrated in FIG. 1 is connected to a reception apparatus 200 via a mutually communicable network 300. The transmission apparatus 100 is connected to a video camera 400 via the network 300. The transmission apparatus 100 and the video camera 400 can be realized by a single apparatus.

The video camera 400 includes an image capturing unit configured to capture an image of an object, a generation unit configured to generate video data from the captured image, and a storage unit configured to store the video data generated by the generation unit. The storage unit can be, for example, a random access memory (RAM) or a read-only memory (ROM). Alternatively, a removable medium such as a memory card can be used to store the video data. The video camera 400 further includes an output unit configured to output the generated video data to the transmission apparatus 100.

Figure 2A:
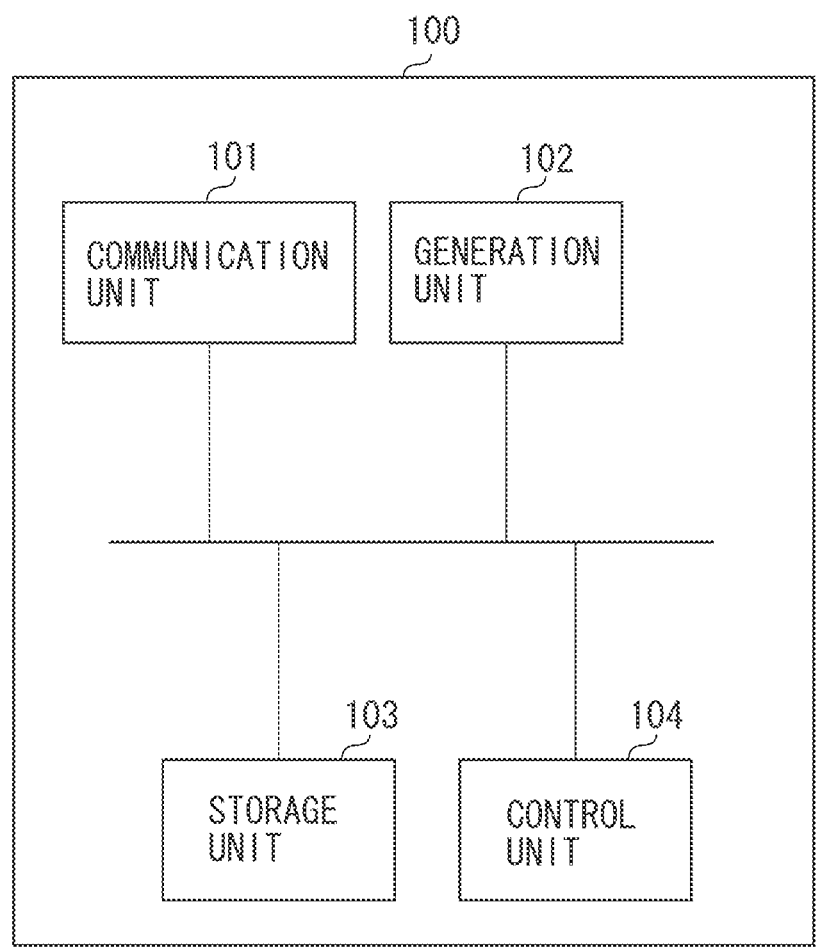
FIG. 2A is a block diagram illustrating a configuration of a transmission apparatus 100 according to the first exemplary embodiment.

Referring to FIGS. 2A and 2B, the transmission apparatus 100 according to the present exemplary embodiment will be described. FIG. 2A is a block diagram illustrating a configuration of the transmission apparatus 100 according to the present exemplary embodiment.

A communication unit 101 inputs contents (video data) output from the video camera 400 to the transmission apparatus 100. The communication unit 101 can sequentially input the video data generated by the video camera 400 to the transmission apparatus 100 while the video camera 400 continues image-capturing. The communication unit 101 can input the video data stored in the storage unit of the video camera 400 after completion of the image-capturing of the video camera 400. Based on the input video data, a plurality of segment data is generated by the generation unit 102 described below to be stored in the storage unit 103 described below.

The communication unit 101 receives a transmission request (hereinafter, playlist request) of metadata (hereinafter, referred to as play list) indicating segment data that the reception apparatus 200 can acquire from the transmission apparatus 100. Contents of the playlist will be described below referring to FIG. 4. The communication unit 101 transmits the playlist generated by the generation unit 102 in response to reception of the playlist request.

Further, the communication unit 101 receives a segment data acquisition request from the reception apparatus that has received the playlist. The communication unit 101 transmits the requested segment data to the reception apparatus 200 in response to the segment data acquisition request.

The generation unit 102 generates, in response to the playlist request from the reception apparatus, a plurality of segment data from the video data input by the communication unit 101. For example, the generation unit 102 divides the video data input from the video camera 400 by predetermined time units into files, thereby generating segment data. Accordingly, a plurality of segment data is generated from the input video data according to a predetermined reproduction time.

There is no limitation on a method for generating segment data. For example, the segment data may be generated for each predetermined data volume. The video data can be divided according to information associated, by a user, with the video data captured by the video camera 400.

Alternatively, the video data can be divided according to information associated, by the video camera 400, with the video data according to moving image contents.

For example, when the video camera 400 has a function of detecting a moving object in the video, the video data can be divided according to a moving object detection result in the video. Not limited to the case of detecting the moving object by the video camera 400, the video camera 400 may detect a specific object such as a human body, and the video data may be divided according to a specific object detection result in the video.

For example, the video data can be divided at timing of detecting the moving object or the specific object in the video by the video camera 400, or at timing when the moving object or the specific object detected thus far is no longer detected.

The method for dividing the video data by the predetermined time units and the method for dividing the video data according to the moving image or specific object detection result may be used in combination. While neither a moving object nor a specific object is detected, the video data is divided for each predetermined time to generate segment data. Further, when a moving object or a specific object is detected, the video data is divided irrespective of the predetermined time to generate new segment data. The video data can be divided again for each predetermined time from a position of dividing the video data according to detection of the moving object or the specific object to generate segment data.

In the present exemplary embodiment, a segment number is associated with each segment data. A series of segment numbers can be allocated sequentially from 1. Alternatively, generation time of segment data can be allocated. Otherwise, time of creating a part of video data equivalent to segment data can be allocated. In the present exemplary embodiment, the example of sequentially allocating numbers from 1 will be described. Segment data is older as a segment number is smaller, while segment data is newer as a segment number is larger. The older segment data means segment data a reproduction order of which is earlier in time in the reception apparatus 200. The newer segment data means segment data a reproduction order of which is later in time in the reception apparatus 200. The segment number is information for identifying each segment data. The generated segment data is stored in the storage unit 103.

The generation unit 102 includes a plurality of pieces of specific information in one playlist generated for the segment data stored in the storage unit 103. The specific information is information used by the reception apparatus 200 to identify segment data that the reception apparatus 200 can acquire.

In the present exemplary embodiment, a case where the number of pieces of specific information includable in the playlist generated by the generation unit 102 is limited to a predetermined number will be described. By setting such an upper limit on the number of pieces of specific information includable in one playlist, a data volume of the playlist transmitted to the reception apparatus 200 can be reduced. Thus, a load on the network when the playlist is transmitted can be reduced compared with a case where a playlist including specific information of all segment data that the transmission apparatus 100 can transmit is transmitted.

FIG. 4 illustrates an example of the playlist generated by the generation unit 102. In the present exemplary embodiment, an example in which one playlist includes three pieces of specific information as an upper limit will be described.

In FIG. 4, pieces of information described in rows 121, 122, and 123 are respectively pieces of specific information of different segment data.

Information described in a column 131 illustrated in FIG. 4 indicates a segment number associated with each segment data. The segment number is used for identifying specific information. The segment number represents a reproduction order of segment data according to each specific information included in the playlist. For example, a reproduction order is later as the segment number is larger. In the example illustrated in FIG. 4, corresponding segment data is reproduced in the order of segment numbers 1, 2, and 5. However, the production number may be represented without using any segment numbers. For example, an order of pieces of specific information described in the playlist can represent a reproduction order of corresponding segment order. In the example illustrated in FIG. 4, the segment data may be reproduced sequentially from upper specific information.

Information described in a column 132 illustrated in FIG. 4 indicates a place where segment data corresponding to each specific information is stored. In the example illustrated in FIG. 4, in the column 132, a URI indicating the storage place of the segment data is described.

Information described in a column 133 illustrated in FIG. 4 indicates a length of the reproduction time of segment data corresponding to each specific information. In the example illustrated in FIG. 4, the reproduction time of segment data corresponding to each specific information is 0.5 seconds. When segment data is generated for each predetermined reproduction time, reproduction time may not be described in the playlist.

The storage unit 103 stores the segment data generated by the generation unit 102. When the control unit 104 described below includes a processor such as a central processing unit (CPU), the storage unit 103 stores a program executed by the processor. Further, when the control unit 104 described below includes a processor, the storage unit 103 may be used for temporarily storing a parameter used by the processor to execute the program. The storage unit 103 may be, for example, a ROM or a RAM. A removable medium can be used for the storage unit 103. A part or all of the storage unit 103 may be an external storage device. The storage unit 103 may include a plurality of recording media.

The control unit 104 controls an operation of each component of the transmission apparatus 100 illustrated in FIG. 2A. The control unit 104 can be configured of, for example, a processor such as a CPU. When the control unit 104 is a processor, the control unit 104 controls the operation of each component of the transmission apparatus 100 illustrated in FIG. 2A by reading and executing the program stored in the storage unit 103.

FIG. 2B illustrates a functional block diagram of the transmission apparatus 100. Each component illustrated in FIG. 2B indicates a functional module executed by the control unit 104 controlling each component of the transmission apparatus 100. Some or all of the components illustrated in FIG. 2B may be executed by the control unit 104 and independent hardware.

A video data input unit 111 inputs video data input from the video camera 400 to the transmission apparatus 100.

A segment data generation unit 112 generates segment data from the input video data. The segment data generation unit 112 also outputs information of the generated segment data to a playlist generation unit 115.

A segment data request acquisition unit 113 receives an acquisition request of segment data (hereinafter, referred to as segment data request) transmitted from the reception unit 200. The segment data request acquisition unit 113 analyzes a content of the received segment data request to determine which of the segment data stored in the transmission apparatus 100 is requested. The segment data request acquisition unit 113 transmits a determination result to a segment data transmission unit 114.

A segment data transmission unit 114 transmits segment data according to the request from the reception apparatus 200 to the reception apparatus 200. The segment data transmission unit 114 notifies a determination unit 117 of the number of segment data already transmitted to the reception apparatus 200.

The playlist generation unit 115 generates a playlist of the segment data generated by the segment data generation unit 112 based on a determination result of the determination unit 117 described below.

A playlist request reception unit 116 receives a playlist request transmitted from the reception apparatus 200. The playlist request reception unit 116, which has received the playlist request, notifies a playlist transmission unit 118 of the reception of the playlist request.

The determination unit 117 stores the number of the transmitted segment data already transmitted from the segment data transmission unit 114. The determination unit 117 determines whether the segment data has been transmitted to the reception apparatus 200 based on the stored information. The determination unit 117 notifies the playlist transmission unit 118 of a determination result.

The playlist transmission unit 118 transmits the playlist generated by the playlist generation unit 115 to the reception unit 200.

Figure 3A:
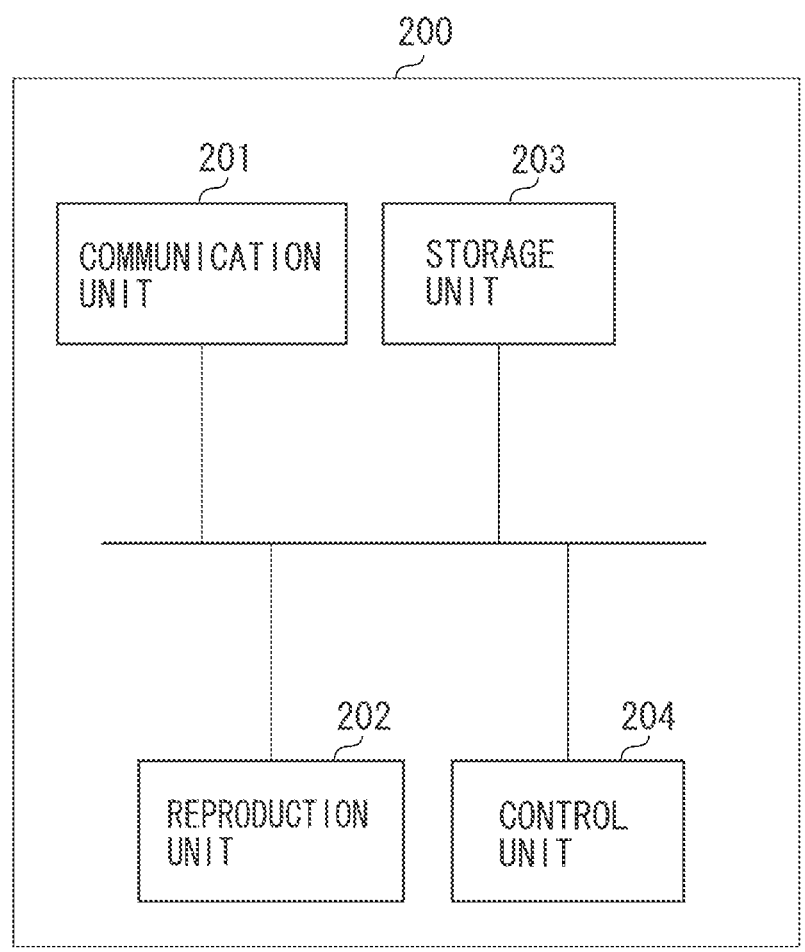
FIG. 3A is a block diagram illustrating a configuration of a reception apparatus 200 according to the first exemplary embodiment.

Next, the reception apparatus 200 will be described referring to FIGS. 3A and 3B. FIG. 3A illustrates a configuration of the reception apparatus according to the present exemplary embodiment.

A communication unit 201 transmits a playlist request for requesting transmission of a playlist to the transmission apparatus 100. In the present exemplary embodiment, when reception of segment data is started according to a user's instruction, the reception apparatus 200 transmits playlist requests to the transmission apparatus 100 at predetermined intervals. The communication unit 201 receives a playlist from the transmission apparatus 100 according to the transmission of the playlist request.

The communication unit 201 transmits an acquisition request of segment data corresponding to specific information included in the playlist to the transmission apparatus 100. The communication unit 201 receives segment data from the transmission apparatus 100 according to the acquisition request of the segment data.

A reproduction unit 202 performs reproduction processing for the segment data received by the communication unit 201.

A storage unit 203 stores the playlist received from the transmission apparatus 100. The storage unit 203 may delete the playlist after an acquisition request of segment data has been issued by using the stored playlist. Accordingly, reception of the segment data can be realized with a smaller storage capacity compared with a case where the received playlist is continuously stored.

The storage unit 203 stores the segment data transmitted from the transmission apparatus 100. The storage unit 203 may delete the segment data after the stored segment data has been reproduced by the reproduction unit 202. Accordingly, reproduction of the segment data can be realized with a smaller storage capacity compared with a case where the received segment data is continuously stored.

When a control unit 204 described below includes a processor such as a CPU, the storage unit 203 stores a program executed by the processor. Further, when the control unit 204 described below includes a processor, the storage unit 203 is used for temporarily storing a parameter used by the processor to execute the program. The storage unit 203 may be configured of, for example, a ROM or a RAM. A removable medium can be used for the storage unit 203. A part of or all of the storage unit 203 may be configured of an external storage device. The storage unit 203 may be configured of a plurality of recording media.

The control unit 204 controls an operation of each component of the reception apparatus 200 illustrated in FIG. 3A. The control unit 204 can be configured of, for example, a processor such as a CPU. When the control unit 204 is a processor, the control unit 204 controls the operation of each component of the reception apparatus 200 illustrated in FIG. 3A by reading and executing the program stored in the storage unit 203.

Figure 3B:
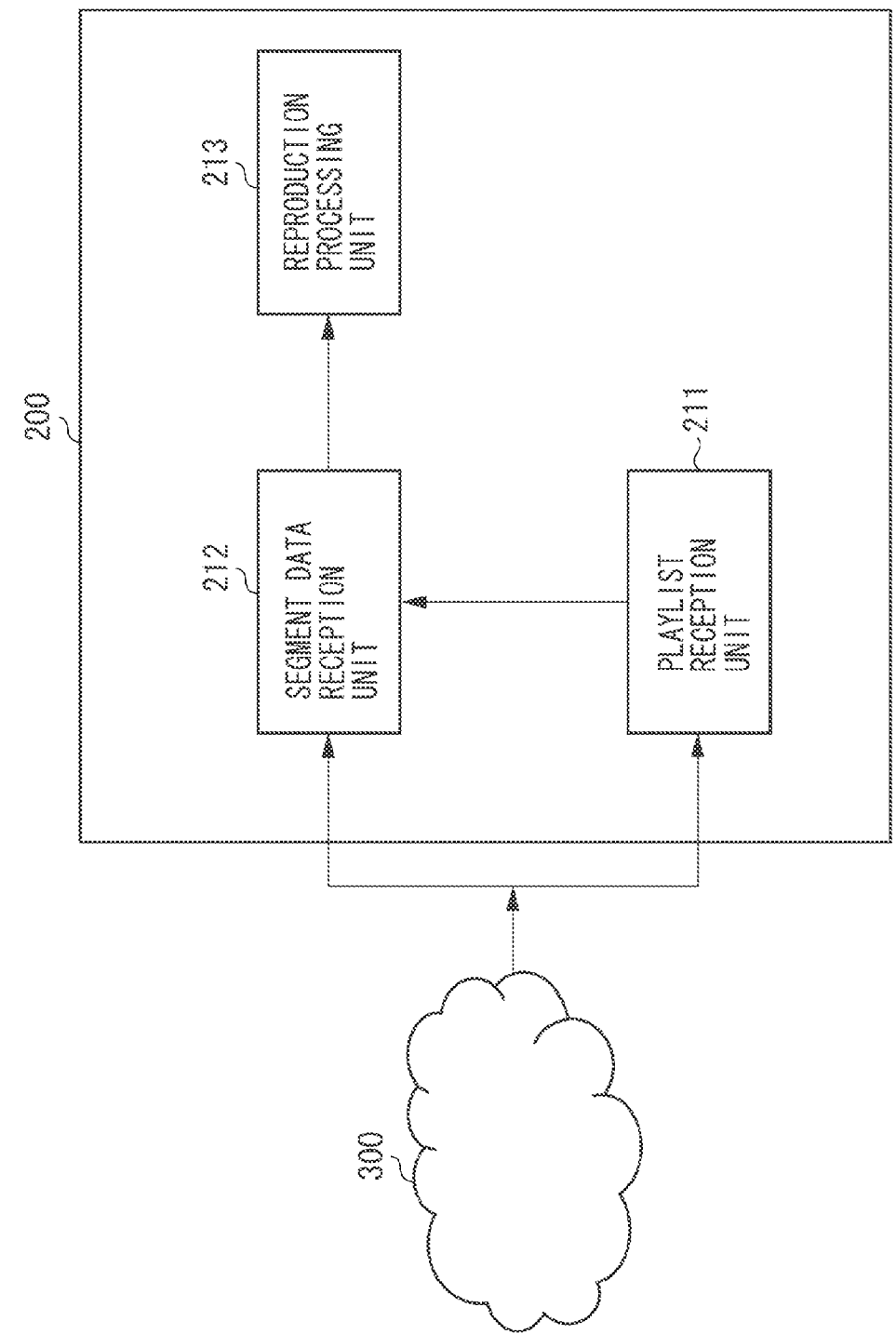
FIG. 3B is a block diagram illustrating a functional configuration of the reception apparatus 200 according to the first exemplary embodiment.

FIG. 3B illustrates a functional block diagram of the reception apparatus 200. Each component illustrated in FIG. 3B indicates a functional module executed by the control unit 204 controlling each component of the reception apparatus 200. Some of or all of the components illustrated in FIG. 3B may be executed by independent hardware independent from the control unit 204.

A playlist reception unit 211 receives metadata transmitted from the transmission apparatus 100. The playlist reception unit 211 transmits URIs included in the playlist to a segment data reception unit 212 in the order determined according to the contents of the received playlist.

The segment data reception unit 212 receives segment data transmitted from the transmission unit 100 by using the URIs transmitted from the playlist reception unit 211. The segment data reception unit 212 transmits the received segment data to a reproduction processing unit 213.

The reproduction processing unit 213 performs reproduction processing of the segment data transmitted from the segment data reception unit 212.

Figure 5:
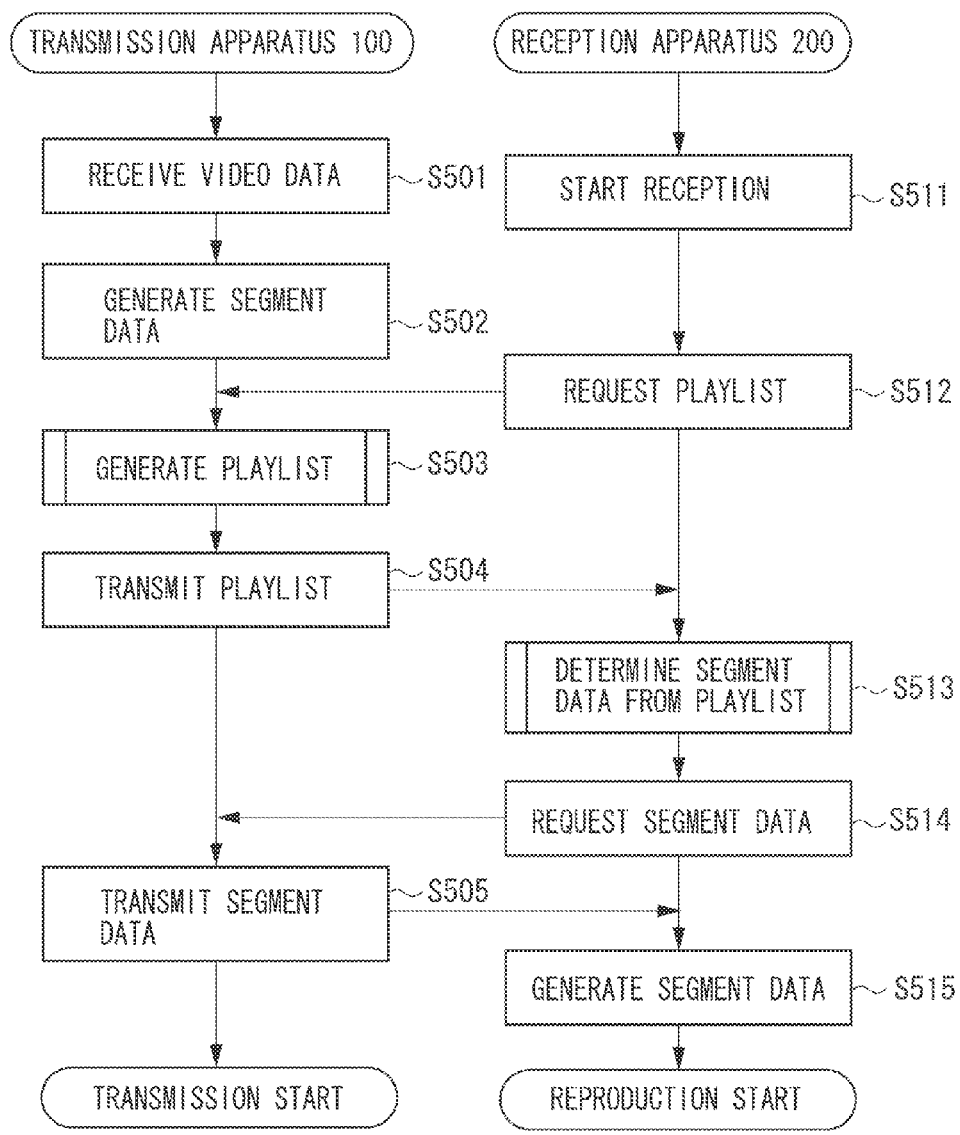
FIG. 5 is a sequence diagram illustrating video data transmission processing in the transmission system according to the first exemplary embodiment.

Next, referring to FIG. 5, the data transmission and reception between the transmission apparatus 100 and the reception apparatus 200 until the reproduction start of video data will be described.

In step S501, the transmission apparatus 100 receives video data from the video camera 400. In step S502, the transmission apparatus 100 generates a plurality of segment data from the received video data. For example, the transmission apparatus 100 generates the segment data by dividing the video data input from the video camera 400 by predetermined time units into files. Accordingly, the plurality of segment data is generated from the input video data according to a predetermined reproduction time. There is no particular limitation on a method for generating segment data. For example, segment data may be generated for each data volume. The video data can be divided according to information associated with the video data captured by the video camera 400 by the user. The video data may also be divided based on information associated with the video data by the video camera 400 according to the moving image content. The generated segment data is stored in the storage unit 103 of the transmission apparatus 100.

When a reception start of the video data is instructed by the user in step S511, in step S512, the reception apparatus 200 transmits playlist requests to the transmission apparatus 100 at predetermined intervals. For example, the reception apparatus 200 transmits the playlist requests to the transmission apparatus 100 at predetermined time intervals.

In step S503, the transmission apparatus 100 generates a playlist after it has received the playlist request from the reception apparatus 200. This playlist is metadata indicating segment data receivable by the reception apparatus 200. A generation method of the playlist will be described below referring to FIG. 7. In step S504, the transmission apparatus 100, which has generated the playlist, transmits the playlist to the reception apparatus 200. As described above referring to FIG. 5, the playlist can include specific information about a plurality of segment data. Accordingly, the transmission apparatus 100 transmits the metadata indicating segment data acquirable by the reception apparatus among the plurality of segment data constituting the content to the reception apparatus 200.

In step S513, the reception apparatus 200, which has received the playlist from the transmission apparatus 100, determines the segment data to be reception-requested among segment data corresponding to a plurality of pieces of specific information included in the received playlist. The number of segment data to be reception-requested may be one or more. The determination processing of the segment data to be reception-requested will be described in detail below referring to FIG. 8. In step S514, the reception apparatus 200 transmits a segment data request for requesting transmission of the segment data determined in step S513 to the transmission apparatus 100. At this time, the reception apparatus 200 requests the segment data to the transmission apparatus 100 by using the specific information (e.g., URI) included in the playlist.

In step S505, the transmission apparatus 100, which has received the segment data request from the reception apparatus 200, reads the requested segment data to transmit it to the reception apparatus 200. In the present exemplary embodiment, when the reception apparatus 200 receives a new playlist during the segment data reception, the reception apparatus 200 can start reception of segment data by using specific information included in the newly received playlist after completion of the current segment data reception. Alternatively, when the reception apparatus 200 receives the new playlist during the segment data reception, the reception apparatus 200 may start reception of segment data by using specific information included in the newly received playlist by canceling the current segment data reception.

In step S515, after reception of the segment data from the transmission apparatus 100, the reception apparatus 200 reproduces the received segment data. In this way, the transmission apparatus 100 transmits the segment data in response to the acquisition request of the segment data. Thus, reproduction of the video data is started.

The transmission apparatus 100 may sequentially delete the segment data stored in the storage unit 103 after the segment data has been generated. For example, the segment data can be deleted with a passage of a predetermined time after the segment data generation. Alternatively, the stored segment data can be deleted when a volume capable of being stored in the storage unit 103 is equal to or less than a predetermined value.

The reception apparatus 200 may delete the playlist after selection of specific information from the playlist.

Next, referring to FIG. 6, processing between the transmission apparatus 100 and the reception apparatus 200 to end the transmission of the video data in the present exemplary embodiment will be described.

In step S611, the reception apparatus 200 receives an end command of video data reception, from the user. In step S512, the reception apparatus 200 that has received the end command issues to the transmission apparatus 100 a playlist request including an end instruction for instructing the end of video transmission.

In step S503, after receiving the playlist request including the end instruction, the transmission apparatus 100 generates a playlist including an end tag indicating the transmission end of the video data. In step S504, the transmission apparatus 100 transmits the playlist including the end tag to the reception apparatus 200.

The processing between the transmission apparatus 100 and the reception apparatus 200 from the reception of the playlist by the reception apparatus 200 in step S513 to the reproduction of the segment data by the reception apparatus 200 in step S515 is similar to that described above referring to FIG. 5, and thus description thereof will be omitted.

After receiving the playlist including the end tag from the transmission apparatus 100, the reception apparatus 200 ends the playlist request. That is, as described above referring to FIG. 5, the reception apparatus 200 issues playlist requests at respective predetermined intervals until it receives the playlist including the end tag from the transmission apparatus 100. In step S612, after receiving the playlist including the end tag from the transmission apparatus 100, the reproduction of the video data is ended.

Figure 6:
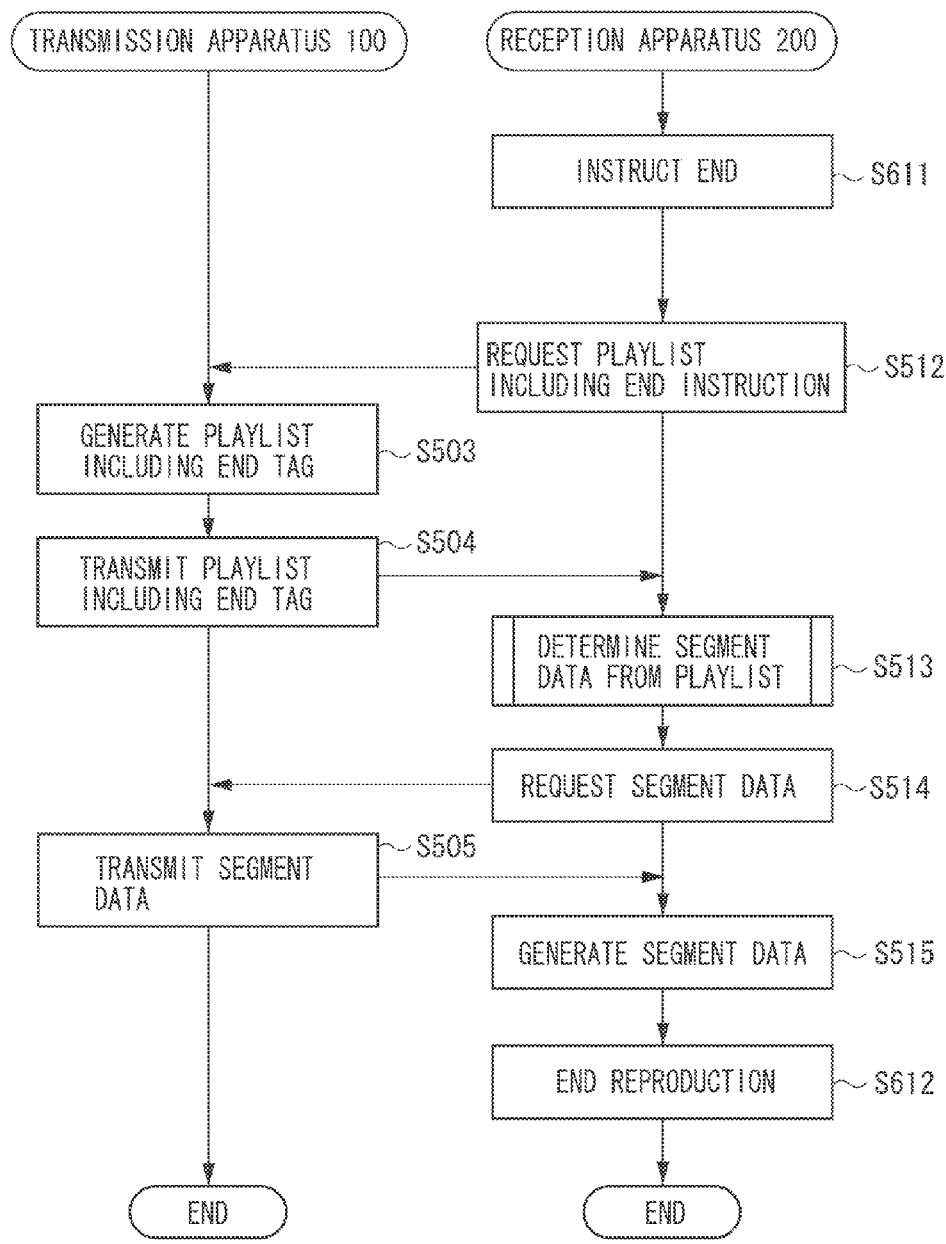
FIG. 6 is a sequence diagram illustrating video data reproduction end processing in the transmission system according to the first exemplary embodiment.

The example illustrated in FIG. 6 is a case where the reception apparatus 200 transmits the end instruction to the transmission apparatus 200. However, a method for ending the transmission of the video data is not limited to this. For example, the reception apparatus 200 may not transmit the end instruction. When the transmission apparatus 100 determines that the transmission of the video data will be ended, the transmission apparatus 100 may transmit the playlist including an end tag. The reception apparatus 200, which has received the playlist including the end tag, does not transmit a playlist list request thereafter. As a case where the transmission apparatus 100 determines that the transmission of the video data will be ended, for example, there is a case where video transmission including the last of a block of video data is ended, or a case where an end of the video data transmission is instructed by a user's operation of the transmission apparatus 100.

Next, the segment data generation processing performed in step S502 in the transmission apparatus 100 will be described. The transmission apparatus 100 according to the present exemplary embodiment generates a playlist to satisfy the following rules (1) to (3).

(1) Playlist includes specific information (e.g., URI) corresponding to segment data the number of which is equal to or less than a predetermined number.

For example, when the predetermined number is three, one playlist can include specific information up to three pieces corresponding to segment data. For example, as illustrated in FIG. 5, the playlist can include specific information about three segment data of segment numbers 1, 2, and 5. The number of segment data corresponding to the specific information included in the playlist may be equal to or less than the predetermined number. When the predetermined number is three, the playlist can include specific information corresponding to 0 to 3 segment data.

(2) A second playlist is generated so as to include, among segment data corresponding to specific information included in a first playlist last transmitted to the reception apparatus 200, specific information of segment data that has not yet transmitted to the reception apparatus 200.

In other words, among the segment data corresponding to the specific information included in the first playlist transmitted last time to the reception apparatus 200, specific information of segment data before the segment data that has already transmitted to the reception apparatus 200 is prevented from being included in the second playlist.

As an example, a case where the first playlist including specific information about segment data of segment numbers 1st, 2nd, and 3rd is transmitted will be described. It is presumed that at the time of generating a second playlist to be transmitted to the reception apparatus 200 after the first playlist, among the segment data of segment numbers 1st, 2nd, and 3rd, only the segment data of the segment number 1st has been transmitted to the reception apparatus. In this case, the generation unit 102 of the transmission apparatus 100 generates the second playlist so as to include specific information about the segment data of segment numbers 1st, 2nd, and 3rd. If the segment data of the segment number 2nd or 3rd is deleted from the storage unit 103 of the transmission apparatus 200 during the generation of the second playlist, specific information corresponding to the segment number is prevented from being included in the playlist.

Thus, during the generation of the second playlist, whether the reception apparatus 200 can acquire the segment data of segment numbers 1st, 2nd, and 3rd can be indicated to the reception apparatus 200.

(3) When the number of pieces of specific information determined to be included by applying the rule (2) is smaller than that of the rule (1), segment data reproduced after the segment data corresponding to the specific information determined to be included by applying the rule (2) is included in the playlist.

As an example, a case where the first playlist including specific information about the segment data of segment numbers 1st, 2nd, and 3rd is transmitted will be described. If the segment data of the segment number 1st has been transmitted to the reception apparatus, the second playlist includes specific information about the segment data of segment numbers 2nd and 3rd according to the rule (2). The three pieces of specific information of segment data can be included according to the rule (1). Thus, in addition to the specific information of the segment numbers 2nd and 3rd, for example, the second playlist can include specific information about segment data of a segment number 4th to be transmitted. If segment data up to that of segment number 6th has been stored in the storage unit 103 of the transmission apparatus 100 at the time of generating the second playlist, the second playlist can include specific information about segment data reproduced after that of the segment number 4th to be transmitted. In other words, in addition to the specific information of the segment numbers 2nd and 3rd, specific information about the segment data of the segment number 5th or 6th may be included in the second playlist.

Next, referring to a flowchart illustrated in FIG. 7, the segment data generation processing performed in step S502 in the transmission apparatus 100 will be described. In a form where the control unit 104 of the transmission apparatus 100 includes a processor, a processing flow illustrated in FIG. 7 indicates a program for causing the control unit 104 to execute a procedure illustrated in FIG. 7. The processor included in the control unit 104 of the transmission apparatus 100 is a computer configured to execute the program read from the storage unit 103 included in the transmission apparatus 100.

First, in step S701, the transmission apparatus 100 determines whether a playlist request received from the reception apparatus 200 is a first playlist request after a start of video transmission.

Whether the playlist request is a first playlist request can be determined based on whether session identification information included in the received playlist request is identical to identification information of a session currently established by the transmission apparatus 100. It is presumed that the identification information of the session currently established by the transmission apparatus 100 is stored in the storage unit 103 of the transmission apparatus 100. The session identification information is identification information for identifying a communication session established with the other apparatus by the transmission apparatus 100.

If the session identification information included in the received playlist request has not been stored in the storage unit 103, the transmission apparatus 100 determines that the received playlist request is a first playlist request. Then, the session identification information included in the received playlist request is stored in the storage unit 103. On the other hand, if the session identification information included in the received playlist request is identical to the identification information of the session currently established by the transmission apparatus 100, the received playlist request is determined not to be a first playlist request.

When the received playlist request is a first playlist request (YES in step S701), in step S702, the transmission apparatus 100 sets to 0 the number of metadata transmission candidates included in a new playlist to be transmitted. Then, the processing proceeds to step S703.

In step S703, the transmission apparatus 100 compares the number of transmission candidates with a predetermined number N, and adds to the playlist pieces of specific information equal in number to a difference. The predetermined number is an upper limit value of a number of pieces of specific information permitted to be included in the playlist. In the present exemplary embodiment, for example, the predetermined number is 3. When the processing proceeds from step S702 to step S703, pieces of specific information equal in number to a difference of 3 from the predetermined number is added because the number of transmission candidates is 0.

Segment data corresponding to the specific information to be added can be selected among the plurality of segment data stored in the storage unit 103 of the transmission apparatus 100. For example, a predetermined number can be selected from segment data earlier in reproduction order. For example, when segment data 1st to 10th is stored in the storage unit 103, specific information corresponding to the segment data of the segment numbers 1st, 2nd, and 3rd can be selected to be added to the playlist.

Alternatively, among the segment data generated by the transmission apparatus 100, newer data may be selected. For example, when the transmission apparatus 100 has generated and stored segment data 1st to 10th, specific information corresponding to the segment data of the segment numbers 8th, 9th, and 10th can be selected to be added to the playlist. There is no particular limitation on a method for selecting specific information to be added in step S703.

In step S704, a playlist is generated so as to include specific information corresponding to the segment data selected in step S703.

On the other hand, when it is determined that the received playlist request is not a first playlist request (NO in step S701), the transmission apparatus 100 generates a second playlist to be generated next according to a content of the first playlist transmitted to the transmission apparatus 100 last time.

In step S705, the transmission apparatus 100 sets all the pieces of specific information included in the first playlist transmitted last time as transmission candidates. For example, when the first playlist includes the specific information of segment numbers 1st, 2nd, and 3rd, the specific information of segment numbers 1st, 2nd, and 3rd is set as transmission candidates of specific information included in the second playlist to be transmitted.

Then, in step S706, the transmission apparatus 100 determines whether the transmission candidates set in step S705 include specific information of segment data to be reproduced before the transmitted segment data.

As an example, a case where the specific information of segment numbers 1st, 2nd, and 3rd are set as transmission candidates in step S705 will be described. When the segment data of the segment number 1st has been transmitted to the reception apparatus 200 at the time of determination in step S706, in step S706, it is determined that the specific information of the segment data before the transmitted segment data is included in the transmission candidates. In this case (YES in step S706), the processing proceeds to step S707.

On the other hand, when the segment data of the segment number 1st is not transmitted to the reception apparatus 200, in step S706, it is determined that the specific information of the segment data before the transmitted segment data is not included in the transmission candidates. In this case (NO in step S706), the processing proceeds to step S708.

In step S707, the transmission apparatus 100 executes processing of removing the specific information of the segment data before the transmitted segment data from the transmission candidates set in step S705. Whether the segment data has been transmitted is determined by the determination unit 117 as described above referring to FIG. 2B. As an example, a case where the specific information of segment numbers 1st, 2nd, and 3rd is set as transmission candidates in step S705 will be described. When the segment data of the segment number 1st has been transmitted to the reception apparatus 200 at the time of determination in step S706, processing of removing the specific information of the segment number 1st from the transmission candidates is executed. In other words, as the transmission candidates, the pieces of specific information of the segment numbers 2nd and 3rd is set as transmission candidates while the specific information of the segment number 1st is not set as a transmission candidate. The number of transmission candidates at this time is 2. After step S706, the processing proceeds to step S708. In the present exemplary embodiment, the case where the processing of removing the specific information of the segment number before the transmitted segment data is executed has been described. However, the specific information of the segment number after the transmitted segment data may be removed.

Thus, when the second acquisition request of metadata is received after the first acquisition request of the metadata has been received, the second metadata is generated as follows. That is, segment data to be reproduced before the first segment data transmitted to the reception apparatus can be prevented from being included as the segment data acquirable by the reception apparatus. The second metadata including, among a plurality of segment data included in the first metadata transmitted in response to the first acquisition request, segment data to be reproduced after the first segment data as segment data acquirable by the reception apparatus can be generated.

Even in the case of segment data newer than the segment data determined to have been transmitted by the determination unit, if a predetermined time has elapsed after the generation, specific information of the segment data may not set as a transmission candidate.

Then, in step S708, the transmission apparatus 100 determines whether the number of transmission candidates is smaller than a predetermined number. The predetermined number corresponds to an upper limit number of pieces of specific information includable in the playlist. In the present exemplary embodiment, the predetermined number is 3. When the number of pieces of specific information of transmission candidates has reached the predetermined number (NO in step S708), in step S704, a playlist including the specific information of the transmission candidates is generated. On the other hand, when the number of pieces of specific information of transmission candidates has not reached the predetermined number (YES in step S708), the transmission apparatus 100 executes step S703.

In step S703, the transmission apparatus 100 compares the number of transmission candidates with a predetermined number N, and adds pieces of specific information equal to a difference in number to the playlist. In the present exemplary embodiment, for example, the predetermined number is 3. For example, when the pieces of specific information of the segment numbers 2nd and 3rd are transmission candidates as a result of the processing of step S707, and thus the number of transmission candidates is 2, in step S703, only one piece of specific information equal to a difference in number between the predetermined number of 3 and the transmission candidate number of 2 is added.

Segment data corresponding to the specific information to be added can be selected, among the plurality of segment data stored in the storage unit 103 of the transmission apparatus 100, from the segment data to be reproduced after the segment data already transmitted to the reception apparatus 200.

For example, a predetermined number can be selected, among the segment data stored in the storage unit 103, from the segment data earlier in reproduction order. For example, when segment data 1st to 10th has been stored in the storage unit 103, in addition to specific information about the segment data of the segment numbers 2nd and 3rd determined in step S707, specific information corresponding to the segment data of the segment number 4th can be selected to be added to the playlist.

Alternatively, among the segment data generated by the transmission apparatus 100, newer data may be selected. For example, when the transmission apparatus 100 has generated and stored segment data of segment numbers 1st to 10th, specific information corresponding to the segment data of the segment number 10th can be selected to be added to the playlist. There is no particular limitation on a method for selecting specific information to be added in step S703.

A playlist is generated so as to include specific information corresponding to the segment data selected in step S703. For example, when the pieces of specific information of the segment numbers 2nd and 3rd is set as transmission candidates in step S707, and the specific information of the segment number 4th is set as a transmission candidate in step S703, a playlist including the pieces of specific information of the segment numbers 2nd, 3rd, and 4th is generated. For example, when the pieces of specific information of the segment numbers 2nd and 3rd are set as transmission candidates in step S707, and the specific information of the segment number 10th is set as a transmission candidate in step S703, a playlist including the pieces of specific information of the segment numbers 2nd, 3rd, and 10th is generated.

Thus, the transmission apparatus 100 generates the playlist.

Figure 8:
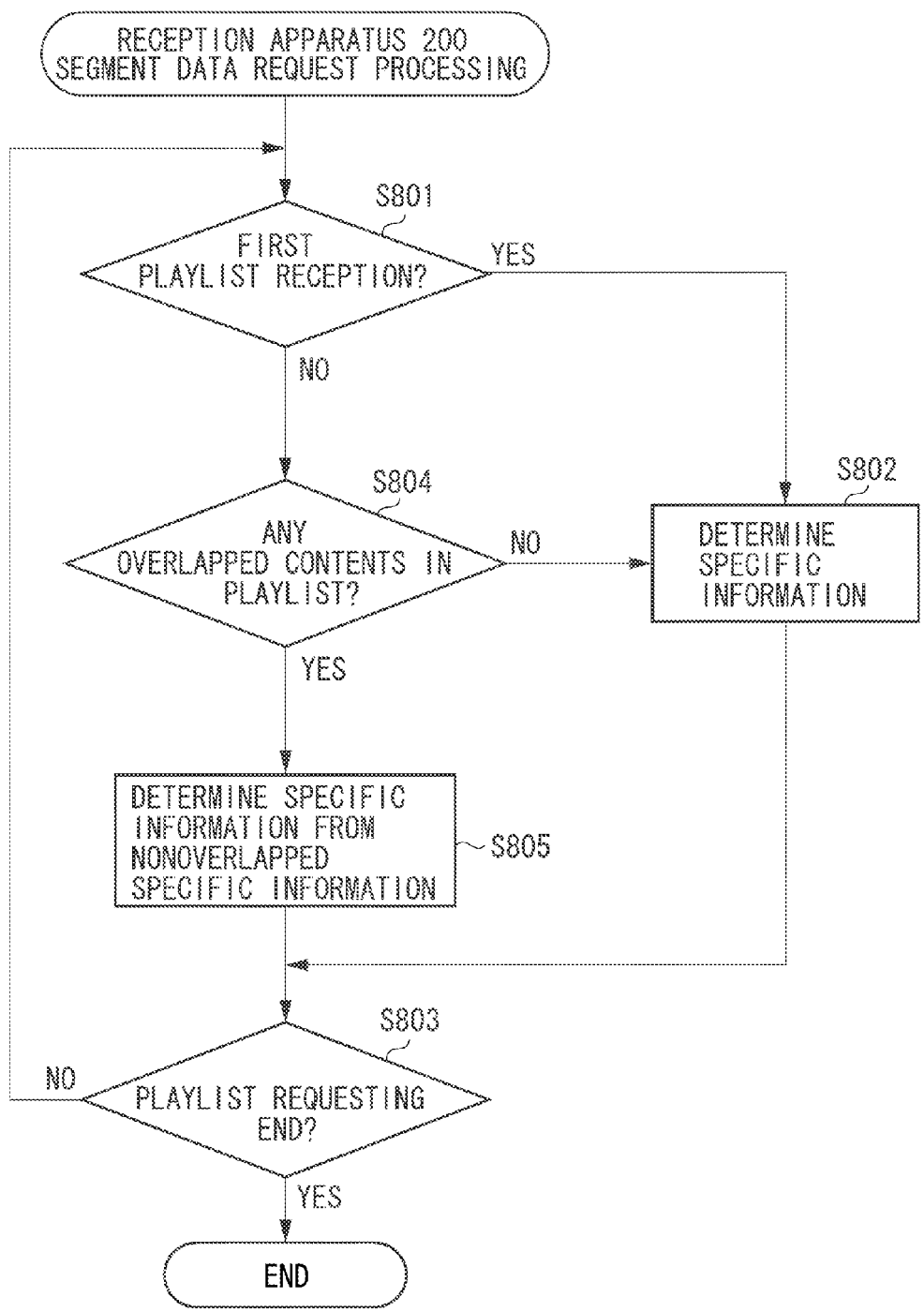
FIG. 8 is a flowchart illustrating segment data request processing in the reception apparatus 200 according to the first exemplary embodiment.

Next, referring to a flowchart illustrated in FIG. 8, the segment data determination processing performed in step S513 in the reception apparatus 200 will be described. In a form where the control unit 204 of the reception apparatus 200 includes a processor, a processing flow illustrated in FIG. 8 indicates a program for causing the control unit 204 to execute a procedure illustrated in FIG. 8. The processor included in the control unit 204 of the reception apparatus 200 is a computer configured to execute the program read from the storage unit 203 included in the reception apparatus 200.

First, in step S801, the reception apparatus 200 determines whether a playlist received from the transmission apparatus 100 is a first playlist request. The reception apparatus 200 stores identification information of the transmission apparatus 100 that has transmitted a playlist request during playlist requesting or session identification information with the transmission apparatus 100 that has transmitted the playlist request. Then, the reception apparatus 200 can determine whether the playlist request is a first playlist request by using the identification information of the transmission apparatus 100 or the session identification information with the transmission apparatus 100. In step S801, whether the received playlist is a playlist transmitted in response to the first playlist request transmitted to the transmission apparatus 100 is determined. Accordingly, the reception apparatus 200 can determine whether the playlist received from the transmission apparatus 100 is a first playlist. However, a determination method is not limited to this.

When the playlist request received from the transmission apparatus 100 is a first playlist request (YES in step S801), one or a plurality of pieces of specific information is selected among those included in the playlist. For example, all the pieces of specific information included in the playlist can be selected. Alternatively, for example, among segment data corresponding to the pieces of specific information included in the playlist, specific information of a predetermined number of segment data can be selected sequentially from segment data later in reproduction order. Otherwise, among the segment data corresponding to the pieces of specific information included in the playlist, segment data to be reproduced last can be selected. Then, in step S802, issuance of an acquisition request of segment data corresponding to the selected specific information is determined.

When the playlist request received from the transmission apparatus 100 is not a first playlist request (NO in step S801), in step S804, overlapping between the specific information in the currently received playlist and specific information included in a last received playlist is determined. The last received playlist is, for example, a playlist received by the reception apparatus 200 from the transmission apparatus 100 just before the currently received playlist.

When there is no overlapping between the specific information in the currently received playlist and the specific information included in the last received playlist (NO in step S804), the processing proceeds to step S802. In step S802, one or a plurality of pieces of specific information is selected among those included in the currently received playlist. Then, issuance of an acquisition request of segment data corresponding to the selected specific information is determined.

On the other hand, when there is overlapping between the specific information in the currently received playlist and the specific information included in the last received playlist (YES in step S804), in step S805, the segment data to be requested is determined among segment data corresponding to no overlapped specific information. As in the case of step S802, one or a plurality of pieces of specific information to be requested can be selected. For example, all the pieces of specific information excluding overlapped specific information can be selected. Alternatively, for example, among segment data corresponding to the pieces of specific information excluding the overlapped specific information, specific information of a predetermined number of segment data can be selected sequentially from the segment data later in reproduction order. Otherwise, among the segment data corresponding to the pieces of specific information excluding the overlapped specific information, segment data to be reproduced last can be selected. Then, issuance of an acquisition request of segment data corresponding to the selected specific information is determined.

In step S803, after the segment data requested to be acquired has been determined in step S802 or step S805, the transmission apparatus 100 determines whether to end the playlist requesting. As described above referring to FIG. 6, whether to end the playlist requesting can be determined based on whether the received playlist includes an end tag. When the received playlist includes no end tag, the playlist requesting is determined to be continued. Then, the processing returns to step S801. On the other hand, when the received playlist includes an end tag, the playlist requesting is ended. This way, the reception apparatus 200 determines segment data to be received.

The transmission apparatus 100 according to the present exemplary embodiment receives a second playlist request after it has received a first playlist request. The transmission apparatus 100 transmits the first playlist to the reception apparatus 200 in response to the first playlist request, and the second playlist to the reception apparatus 200 in response to the second playlist request.

The transmission apparatus 100 does not include in the second playlist any specific information of segment data to be reproduced before the first segment data transmitted to the reception apparatus 200.

The transmission apparatus 100 includes in the second playlist, among segment data corresponding to a plurality of pieces of specific information included in the first playlist, specific information corresponding to segment data to be reproduced after the first segment data transmitted to the reception apparatus 200.

According to the present exemplary embodiment, the second playlist can be generated so as to overlap the specific information included in the second playlist with the specific information included in the first playlist. The overlapped specific information is specific information corresponding to the segment data that has not been transmitted to the reception apparatus 200 from the transmission apparatus 100.

With the configuration described above, the reception apparatus 200 can acquire metadata for acquiring segment data generated continuously from the received segment data.

For example, when only specific information of latest generated segment data is transmitted in response to the playlist request, no consideration is given to a transmission situation of the segment data to the reception apparatus 200. Consequently, specific information of segment data discontinuous from the last transmitted segment data may be transmitted. According to the configuration of the present exemplary embodiment, the specific information to be included in the playlist is determined by taking the transmission situation of the segment data to the reception apparatus 200 into consideration. This can increase a probability of transmission of continuous segment data. The continuous segment data refers to segment data continuously generated during segment data generation.

The transmission apparatus 100 according to the present exemplary embodiment generates and transmits, in response to the playlist request, a playlist so as not to include specific information corresponding to the segment data already transmitted to the reception apparatus 200. Accordingly, the reception apparatus 200 can be prevented from transmitting any unnecessary specific information. Thus, any redundant specific information can be prevented from being transmitted to the reception apparatus 200. A load on a communication band during metadata transmission can be reduced.

In the present exemplary embodiment, the number of pieces of specific information included in the playlist is limited equal to or less than the predetermined number. This configuration enables transmission of the playlist with the load on the communication band being reduced. In other words, compared with a case where the transmission apparatus 100 transmits a playlist including specific information of all generated segment data in response to one playlist acquisition request, the playlist can be transmitted with a smaller data capacity. Thus, the load on the communication band for transmitting the playlist can be reduced.

The reception apparatus 200 according to the present exemplary embodiment receives a plurality of pieces of specific information in response to one playlist acquisition request. Accordingly, the reception apparatus 200 can select, among segment data corresponding to the plurality of pieces of specific information included in the playlist, segment data generated later or segment data highly continuous from acquired segment data. For example, it is assumed that the reception apparatus 200 has received segment data of a segment number 1st, and then received a playlist including pieces of specific information of segment numbers 2nd, 3rd, and 5th. In this case, when priority is placed on the continuity of data reproduction, the reception apparatus 200 can request the segment data of the segment number 2nd to the transmission apparatus 100 by using the specific information of the segment number 2nd described in the playlist. In this way, the reception apparatus 200 can receive the segment data of the segment number 2nd after it has received the segment data of the segment number 1st. On the other hand, when priority is placed on the real timeness of data reproduction, the reception apparatus 200 can request the segment data of the segment number 5th to the transmission apparatus 100 by using the specific information of the segment number 5th described in the playlist. Thus, the reception apparatus 200 can receive the segment data of the segment number 5th that is newer segment data generated by the transmission apparatus 100.

For example, when the segment data received by the reception apparatus 200 is recorded, continuous segment data is desirably received and recorded. In such a case, the reception apparatus 200 can select, among the pieces of specific information described in the playlist, specific information corresponding to segment data to be reproduced earlier in time.

On the other hand, when the reception apparatus 200 performs streaming reproduction of video data currently captured by the video camera 400, the reception apparatus 200 desirably receives and reproduces newly generated segment data. In such a case, the reception apparatus 200 can select, among the pieces of specific information described in the playlist, specific information corresponding to segment data to be reproduced later in time. Accordingly, the reception apparatus 200 can reproduce the video data currently captured by the video camera 400 in real time.

Thus, according to the present exemplary embodiment, the reception apparatus can select segment data according to usage of the video data in the reception apparatus 200.

In the present exemplary embodiment, the case where the transmission apparatus 100 stores the video data and generates the plurality of segment data from the video data has been described. However, the present invention is not limited to this. For example, storage of the video data or generation of the segment data may be performed by an external apparatus connected to the transmission apparatus 100. In this case, the transmission apparatus 100 can receive the video data or the segment data from the external apparatus to perform playlist transmission processing or segment data transmission processing as in the aforementioned case.

According to the present invention, transmission and reception of metadata indicating, among a plurality of segment data constituting a content, segment data acquirable by the reception apparatus can be performed according to the transmission situation of the segment data to the reception apparatus.

The configuration of the transmission system according to a second exemplary embodiment is similar to that of the first exemplary embodiment described above referring to FIG. 1, and thus description thereof will be omitted.

The configuration of a transmission apparatus 100 according to the present exemplary embodiment is similar to that described above referring to FIGS. 2A and 2B, and thus description thereof will be omitted.

The configuration of a reception apparatus 200 according to the present exemplary embodiment is similar to that of the first exemplary embodiment described above referring to FIGS. 3A and 3B, and thus description thereof will be omitted.

Next, operations of the transmission apparatus 100 and the reception apparatus 200 according to the present exemplary embodiment will be described.

The outline of transmission and reception of data between the transmission apparatus 100 and the reception apparatus 200 until a start of reproduction of video data is similar to that of the first exemplary embodiment described above referring to FIG. 5. Processing by the transmission apparatus 100 and the reception apparatus 200 for ending transmission of the video data is similar to that of the first exemplary embodiment described above referring to FIG. 6.

Figure 9:
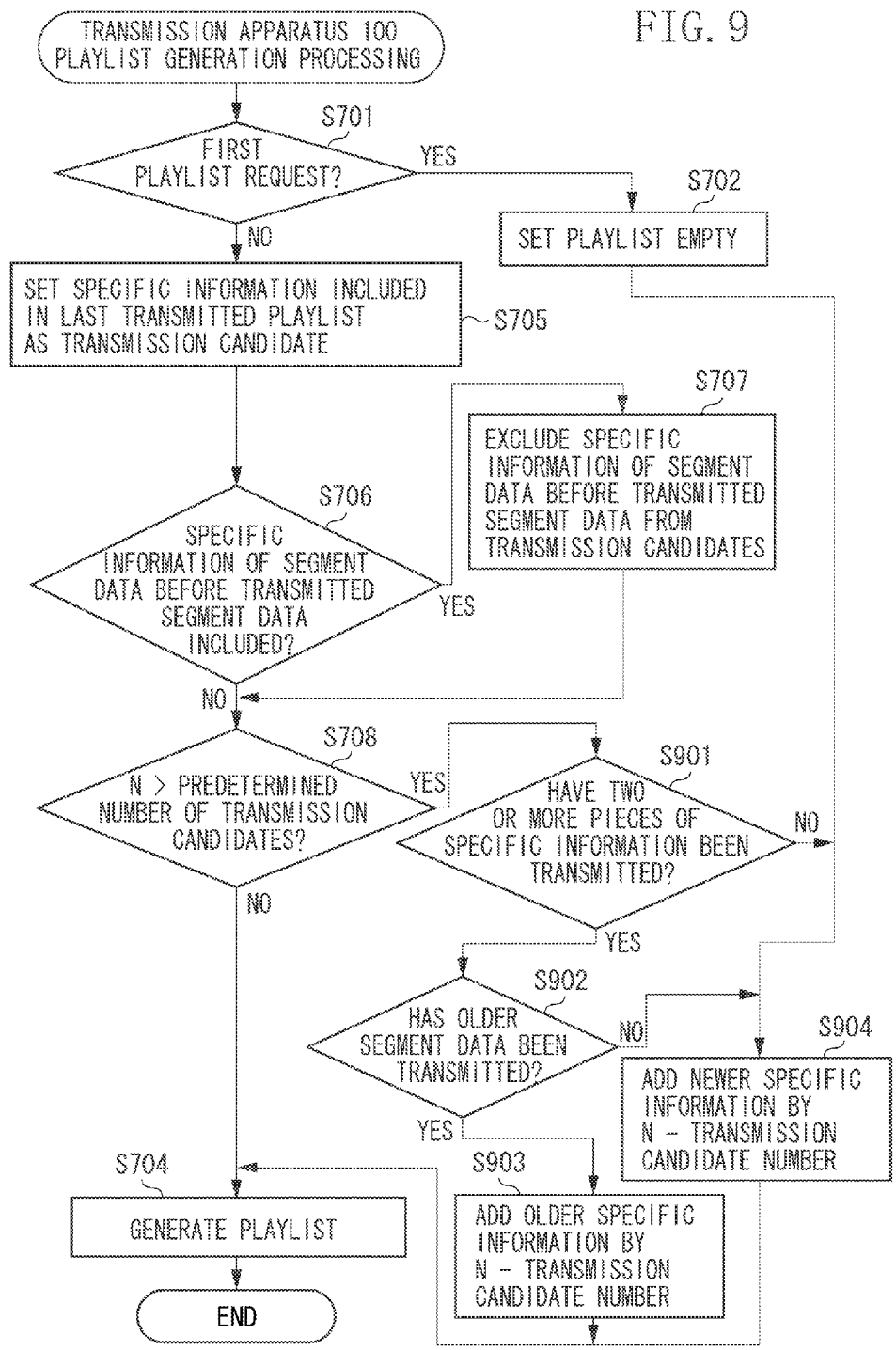
FIG. 9 is a flowchart illustrating playlist generation processing in a transmission apparatus 100 according to a second exemplary embodiment.

Referring to FIG. 9, playlist generation processing performed in step S503 by the transmission apparatus 100 according to the present exemplary embodiment will be described. In a form where a control unit 104 of the transmission apparatus 100 includes a processor, a processing flow illustrated in FIG. 9 indicates a program for causing the control unit 104 to execute a procedure illustrated in FIG. 9. The processor included in the control unit 104 of the transmission apparatus 100 is a computer configured to execute the program read from a storage unit 103 included in the transmission apparatus 100.

Figure 7:
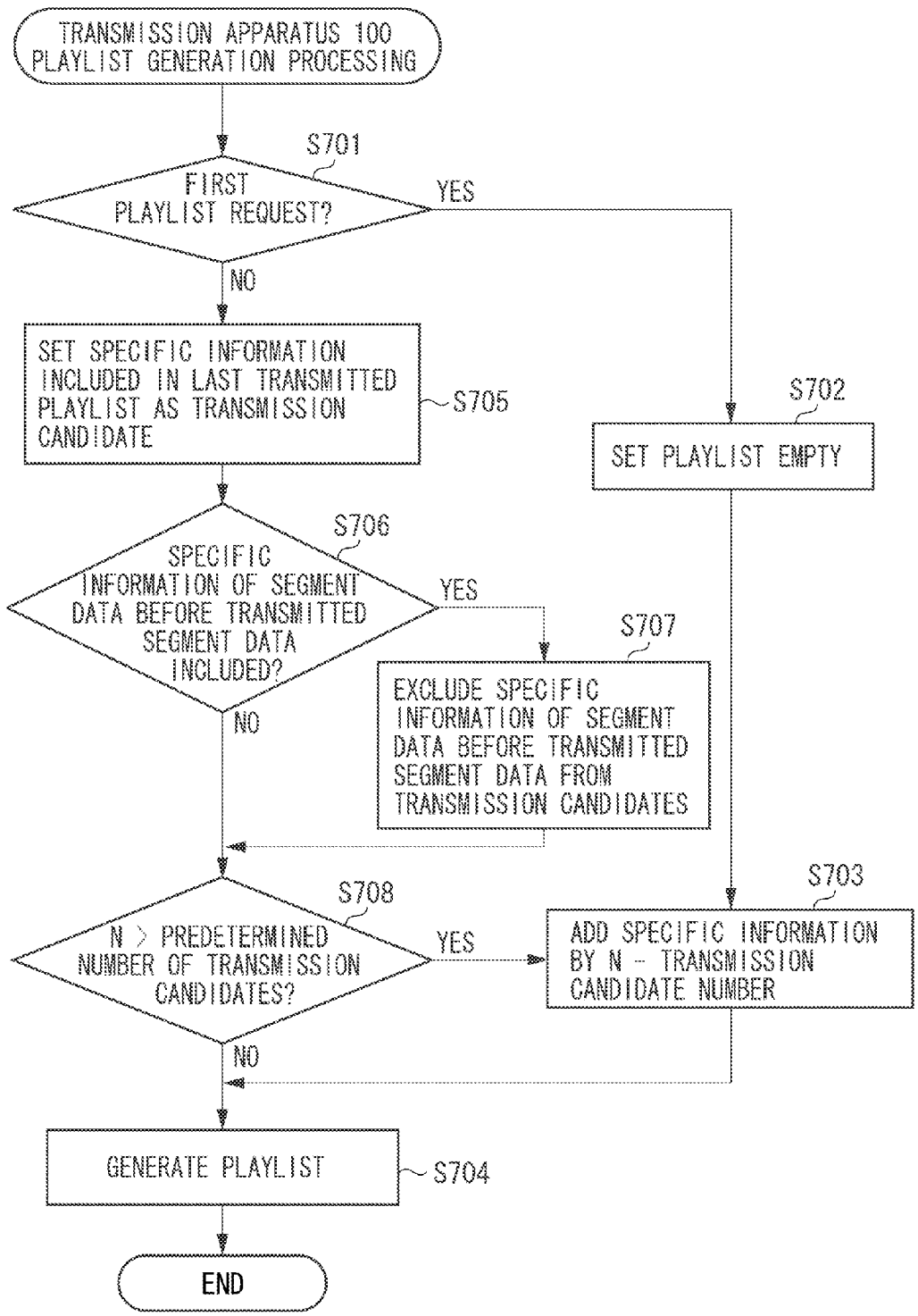
FIG. 7 is a flowchart illustrating playlist generation processing in the transmission apparatus 100 according to the first exemplary embodiment.

Steps S701 and S702 and steps S704 to S708 illustrated in FIG. 9 are similar to those illustrated in FIG. 7, which are denoted by similar reference numerals, and thus description thereof will be omitted.

The transmission apparatus 100 according to the present exemplary embodiment executes processing in step S901 when the number of pieces of specific information of transmission candidates is less than a predetermined number. In step S901, the transmission apparatus 100 determines whether a last transmitted playlist includes two or more pieces of specific information.

When the last transmitted playlist includes two or more pieces of specific information (YES in step S901), the processing then proceeds to step S902. In step S902, the transmission apparatus 100 determines whether, among segment data corresponding to the pieces of specific information included in the last transmitted playlist, segment data to be reproduced earlier (older) has been transmitted to the reception apparatus 200.

For example, it is assumed that pieces of specific information of segment numbers 5th, 6th, and 7th have been described in the last transmitted playlist. In step S902, the transmission apparatus 100 determines whether, among the segment data corresponding to the pieces of specific information included in the last transmitted playlist, segment data to be reproduced earlier (segment number 5th) has been transmitted to the reception apparatus 200.

When it is determined that, among the segment data corresponding to the pieces of specific information included in the last transmitted playlist, segment data to be reproduced earlier has been transmitted to the reception apparatus 200 (YES in step S902), the processing proceeds to step S903.

In step S903, the transmission apparatus 100 compares the number of transmission candidates with a predetermined number N, and adds pieces of specific information equal to a difference in number to the playlist. The predetermined number is an upper limit value of a number of pieces of specific information permitted to be included in the playlist. In the present exemplary embodiment, for example, the predetermined number is 3.

Segment data corresponding to the specific information to be added can be selected, among the plurality of segment data stored in the storage unit 103 of the transmission apparatus 100, from segment data to be reproduced after segment data already transmitted to the reception apparatus 200. In step S903, segment data other than the transmission candidates and earlier in reproduction order is selected.

For example, it is assumed that the pieces of specific information of the segment numbers 6th and 7th have been set as transmission candidates through the processing of steps S701 to S902. It is also assumed that the segment data up to that of the segment number 5th has been transmitted to the reception apparatus 200. It is further assumed that the segment data of the segment numbers 1st to 10th has been stored in the transmission apparatus 200.

In this case, in step S903, the transmission apparatus 100 selects segment data (segment number 8th) earlier in reproduction order among the segment data to be reproduced after the segment data already transmitted to the reception apparatus 200. Then, the transmission apparatus 100 adds specific information corresponding to the selected segment number to the playlist to be transmitted. In this case, the playlist includes the pieces of specific information of the segment numbers 6th, 7th, and 8th.

Thus, when the segment data earlier in reproduction order among the segment data corresponding to the specific information included in the last transmitted playlist is transmitted to the reception apparatus 200, the transmission apparatus 100 determines as follows. The transmission apparatus 100 determines that the reception apparatus 200 has requested the segment data earlier in reproduction order. Then, with priority placed on the continuity of the segment number of specific information included in a playlist to be transmitted next, specific information included in the playlist can be determined.

On the other hand, when the last transmitted playlist does not include two or more pieces of specific information (NO in step S901), the transmission apparatus 100 then executes step S904.

When it is determined that, among segment data corresponding to the pieces of specific information included in the last transmitted playlist, segment data to be reproduced earlier has not been transmitted to the reception apparatus 200 (No in step S902), the transmission apparatus 100 also executes step S904.

In step S904, the transmission apparatus 100 compares the number of transmission candidates with a predetermined number N, and adds pieces of specific information equal to a difference in number to the playlist. The predetermined number is an upper limit value of a number of pieces of specific information permitted to be included in the playlist. In the present exemplary embodiment, for example, the predetermined number is 3.

Segment data corresponding to the specific information to be added can be selected, among the plurality of segment data stored in the storage unit 103 of the transmission apparatus 100, from segment data to be reproduced after segment data already transmitted to the reception apparatus 200. In step S904, segment data other than the transmission candidates and later in reproduction order is selected.

For example, it is assumed that the pieces of specific information of the segment numbers 5th, 6th, and 7th have been described in the last transmitted playlist. It is assumed that the reception apparatus 200, which has received the playlist, has acquired the segment data of the segment number 7th but not the specific information of the segment number 5th.

It is assumed that the number of transmission candidates of pieces of specific information has been set to 0 (no pieces of specific information are transmission candidates) through processing of steps S701 to S902. It is also assumed that the segment data up to that of the segment number 7th has been transmitted to the reception apparatus 200. It is further assumed that the segment data of the segment numbers 1st to 15th has been stored in the transmission apparatus 100.

In this case, in step S903, the transmission apparatus 100 selects segment data (segment numbers 13th, 14th, and 15th) later in reproduction order among the segment data to be reproduced after the segment data already transmitted to the reception apparatus 200. Then, the transmission apparatus 100 adds specific information corresponding to the selected segment numbers to the playlist to be transmitted. In this case, the playlist includes the pieces of specific information of the segment numbers 13th, 14th, and 15th.

Thus, when the segment data later in reproduction order among the segment data corresponding to the specific information included in the last transmitted playlist is transmitted to the reception apparatus 200, the transmission apparatus 100 determines as follows. The transmission apparatus 100 determines that the reception apparatus 200 has requested the segment data later in reproduction order. Then, by setting specific information included in a playlist to be transmitted next as specific information corresponding to newer generated segment data, specific information included in the playlist can be determined.

Thus, the transmission apparatus 100 can determine which of the segment data earlier in reproduction order and the segment data later in reproduction order the reception apparatus 200 requests to acquire. Accordingly, the transmission apparatus 100 can transmit, according to a determination result, specific information to the reception apparatus 200 according to the request of the reception apparatus 200. As a result, among a plurality of segment data included as segment data acquirable by the reception apparatus in the first metadata, segment data determined according to the segment data requested by the reception apparatus can be included in the second metadata.

The reception apparatus 200 may notify the transmission apparatus 100 of which of the segment data earlier in reproduction order and the segment data later in reproduction order it requests to acquire beforehand. In this case, based on a content notified from the reception apparatus 200, the transmission apparatus 100 can determine which of the segment data earlier in reproduction order and the segment data later in reproduction order is requested to be acquired.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-287784 filed Dec. 28, 2012, which is hereby incorporated by reference herein in its entirety.

What is claimed is:

1. A transmission apparatus configured to transmit metadata indicating one or more segments acquirable, among a plurality of segments of content data, by a reception apparatus to the reception apparatus, comprising:
   a reception unit configured to receive an acquisition request of the metadata; and
   a transmission unit configured to transmit to the reception apparatus, in a case where the reception unit receives a second acquisition request of the metadata after the reception unit receives a first acquisition request of the metadata, second metadata indicating one or more segments which are not transmitted to the reception apparatus and not indicating one or more segments which are transmitted to the reception apparatus among a plurality of segments indicated by first metadata transmitted in response to the first acquisition request, wherein a number of segments indicated by the second metadata and not indicated by the first metadata corresponds to a number of segments indicated by the first metadata and not indicated by the second metadata.

2. The transmission apparatus according to claim 1, wherein:
   the reception unit is configured to receive an acquisition request of the segment from the reception apparatus; and
   the transmission unit is configured to transmit the segment in response to the acquisition request of the segment received by the reception unit.

3. The transmission apparatus according to claim 1, wherein a number of segments indicated by the metadata is equal to or less than a predetermined number.

4. The transmission apparatus according to claim 1, wherein the second metadata indicates that the reception apparatus can acquire one or more segments to be reproduced after any of segments indicated by the first metadata which is previously transmitted to the reception apparatus.

5. The transmission apparatus according to claim 1, wherein the second metadata indicates that the reception apparatus can acquire one or more segments determined according to the segment transmitted to the reception apparatus among a plurality of segments indicated by the first metadata which is previously transmitted to the reception apparatus.

6. The transmission apparatus according to claim 1, further comprising:
   an acquisition unit configured to acquire the content data;
   a first generation unit configured to generate a plurality of segments from the content data; and
   a second generation unit configured to generate metadata indicating that the reception apparatus can acquire the segments generated by the first generation unit.

7. A reception apparatus configured to receive from a transmission apparatus metadata indicating one or more segments acquirable, among a plurality of segments of content data, comprising:
   a transmission unit configured to transmit an acquisition request of the metadata;
   a reception unit configured to receive, in a case where the transmission unit transmits a second acquisition request of the metadata after the transmission unit transmits a first acquisition request of the metadata, second metadata indicating one or more segments which are not transmitted by the transmission apparatus and not indicating one or more segments which are transmitted by the transmission apparatus among a plurality of segments indicated by first metadata transmitted in response to the first acquisition request, wherein a number of segments indicated by the second metadata and not indicated by the first metadata corresponds to a number of segments indicated by the first metadata and not indicated by the second metadata; and
   a request unit configured to request a segment indicated by the metadata received by the reception unit.

8. The reception apparatus according to claim 7, wherein a number of segments indicated by the metadata is equal to or less than a predetermined number.

9. The transmission apparatus according to claim 1, wherein the content data includes moving image data.

10. The transmission apparatus according to claim 1, further comprising a determination unit configured to determine the one or more segments to be indicated by the second metadata such that a segment whose reproduction order is the newest of non-transmitted segments is indicated by the second metadata.

11. A transmission method for transmitting to a reception apparatus metadata indicating one or more segments acquirable, among a plurality of segments of content data, by a reception apparatus, the segment data being included, comprising:
   receiving an acquisition request of the metadata; and
   transmitting to the reception apparatus, in a case where the receiving receives a second acquisition request of the metadata after the receiving receives a first acquisition request of the metadata, second metadata indicating one or more segments which are not transmitted to the reception apparatus and not indicating one or more segments which are transmitted to the reception apparatus among a plurality of segments indicated by first metadata transmitted in response to the first acquisition request, wherein a number of segments indicated by the second metadata and not indicated by the first metadata corresponds to a number of segments indicated by the first metadata and not indicated by the second metadata.

12. The transmission method according to claim 11, wherein a number of segments indicated by the metadata is equal to or less than a predetermined number.

13. A reception method, of a reception apparatus, for receiving from a transmission apparatus metadata indicating one or more segments acquirable, among a plurality of segment data constituting content data, comprising:
transmitting an acquisition request of the metadata;
receiving, in a case where the transmitting transmits a second acquisition request of the metadata after the transmitting transmits a first acquisition request of the metadata, second metadata indicating one or more segments which are not transmitted by the transmission apparatus and not indicating one or more segments which are transmitted by the transmission apparatus among a plurality of segments indicated by first metadata transmitted in response to the first acquisition request, wherein a number of segments indicated by the second metadata and not indicated by the first metadata corresponds to a number of segments indicated by the first metadata and not indicated by the second metadata; and
requesting a segment indicated by the metadata received by the receiving.

14. The reception method according to claim 13, wherein a number of segments indicated by the metadata is equal to or less than a predetermined number.

15. A non-transitory computer-readable storage medium storing a program for causing a computer for transmitting to a reception apparatus metadata indicating one or more segments acquirable, among a plurality of content data, by the reception apparatus, to execute a method, comprising:
receiving an acquisition request of the metadata; and
transmitting to the reception apparatus, in a case where the receiving receives a second acquisition request of the metadata after the receiving receives a first acquisition request of the metadata, second metadata indicating one or more segments which are not transmitted to the reception apparatus and not indicating one or more segments which are transmitted to the reception apparatus among a plurality of segments indicated by first metadata transmitted in response to the first acquisition request,
wherein a number of segments indicated by the second metadata and not indicated by the first metadata corresponds to a number of segments indicated by the first metadata and not indicated by the second metadata.

16. The non-transitory computer-readable storage medium according to claim 15, wherein a number of segments indicated by the metadata is equal to or less than a predetermined number.

17. A non-transitory computer-readable storage medium storing a program for causing a computer for receiving from a transmission apparatus metadata indicating one or more segments acquirable, among a plurality of segment data constituting content data, to execute a method, comprising:
transmitting an acquisition request of the metadata;
receiving, in a case where the transmitting transmits a second acquisition request of the metadata after the transmitting transmits a first acquisition request of the metadata, second metadata indicating one or more segments which are not transmitted by the transmission apparatus and not indicating one or more segments which are transmitted by the transmission apparatus among a plurality of segments indicated by first metadata transmitted in response to the first acquisition request, wherein a number of segments indicated by the second metadata and not indicated by the first metadata corresponds to a number of segments indicated by the first metadata and not indicated by the second metadata; and
requesting a segment indicated by the metadata received by the receiving.

* * * * *